United States Patent
Minter

(10) Patent No.: US 7,961,956 B1
(45) Date of Patent: *Jun. 14, 2011

(54) ADAPTIVE FISHER'S LINEAR DISCRIMINANT

(76) Inventor: Thomas Cecil Minter, Coldspring, TX (US)

( * ) Notice: Subject to any disclaimer, the term of this patent is extended or adjusted under 35 U.S.C. 154(b) by 180 days.

This patent is subject to a terminal disclaimer.

(21) Appl. No.: 12/584,316

(22) Filed: Sep. 3, 2009

(51) Int. Cl.
*G06K 9/62* (2006.01)
(52) U.S. Cl. .................. 382/224; 706/12; 382/159
(58) Field of Classification Search .................. 382/224
See application file for complete search history.

(56) References Cited

U.S. PATENT DOCUMENTS

| | | | |
|---|---|---|---|
| 6,137,909 A * | 10/2000 | Greineder et al. ............ | 382/190 |
| 6,567,771 B2 | 5/2003 | Erdogan | |
| 6,594,392 B2 | 7/2003 | Santoni | |
| 6,832,069 B2 * | 12/2004 | Stout et al. .................... | 434/353 |
| 6,857,112 B1 * | 2/2005 | Teig et al. ..................... | 716/115 |
| 6,883,148 B1 * | 4/2005 | Teig et al. ..................... | 716/115 |
| 6,910,025 B2 * | 6/2005 | Cao ................................ | 706/15 |
| 7,054,468 B2 | 5/2006 | Yang | |
| 7,085,426 B2 * | 8/2006 | August ........................... | 382/260 |
| 7,103,200 B2 | 9/2006 | Hillhouse | |
| 7,146,050 B2 | 12/2006 | Lienhart | |
| 7,436,985 B2 * | 10/2008 | Kittler ........................... | 382/115 |
| 7,593,851 B2 * | 9/2009 | Yang .............................. | 704/228 |
| 7,706,610 B2 * | 4/2010 | Zhang et al. ................... | 382/173 |
| 2003/0118246 A1 * | 6/2003 | August ........................... | 382/260 |
| 2003/0172284 A1 * | 9/2003 | Kittler ........................... | 713/186 |
| 2004/0017947 A1 | 1/2004 | Yang | |
| 2005/0123893 A1 * | 6/2005 | Stout et al. .................... | 434/353 |
| 2006/0204081 A1 * | 9/2006 | Zhang et al. .................. | 382/159 |
| 2008/0015793 A1 * | 1/2008 | Ben-Menahem et al. ...... | 702/30 |
| 2008/0260230 A1 * | 10/2008 | Gotardo et al. ................ | 382/131 |
| 2009/0057395 A1 * | 3/2009 | He et al. ......................... | 235/379 |
| 2010/0023307 A1 * | 1/2010 | Lee et al. .......................... | 703/7 |

OTHER PUBLICATIONS

Belcher, W. M. And Minter, T. C., "Selecting Class Weights to Minimize Classification Bias in Acreage Estimation" (1976). LARS Symposia. Paper 133. http://docs.lib.purdue.edu/lars_symp/133.*
Havens, K. A.; Minter, T. C.; and Thadani, S. G., "Estimation of the Probability of Error without Ground Truth and Known A Priori Probabilities" (1976). LARS Symposia. Paper 134. http://docs.lib.purdue.edu/lars_symp/134.*
Lin, G. C. and Minter, T. C., "Bayes Estimation on Parameters of the Single-Class Classifier" (1976). LARS Symposia. Paper 135. http://docs.lib.purdue.edu/lars_symp/135.*
Minter, T. C., "Single-Class Classification" (1975). LARS Symposia. Paper 54. http://docs.lib.purdue.edu/lars_symp/54.*

(Continued)

*Primary Examiner* — Sath V Perungavoor

(57) ABSTRACT

This invention relates generally to a system and method for classifying input patterns into two classes, a class-of-interest or a class-other, utilizing an Adaptive Fisher's Linear Discriminant method capable of estimating an optimal Fisher's linear decision boundary for discriminating between the two classes, when training samples are provided a priori only for the class-of-interest. The system and method eliminates the requirement for any a priori knowledge of the other classes in the data set to be classified. The system and method is capable of extracting statistical information corresponding to the "other classes" from the data set to be classified, without recourse to the a priori knowledge normally provided by training samples from the other classes. The system and method can re-optimize (adapt) the decision boundary to provide optimal Fisher's linear discrimination between the two classes in a new data set, using only unlabeled samples from the new data set.

7 Claims, 7 Drawing Sheets

OTHER PUBLICATIONS

A. K. Jain, R. W. Duin, and J. Mao, "Statistical Pattern Recognition: A Review", IEEE Trans. Pattern Analysis and Machine Intelligence, vol. 22, No. 1, Jan. 2000, pp. 4-37.

A. K. Jain, "Biometrics: A Grand Challenge", Proceeding of the 17th International Conference on Pattern Recognition, (ICPR'04), 2004.

"Summary of NIST Standards for Biometric Accuracy, Tamper Resistance, and Interoperability." ftp://sequoyah.nist.gov/pub/nist_internal_reports/NISTAPP_Nov02.pdf, Nov. 2002.

B. Jeon and D. A. Landgrebe, "Partially Supervised Classification With Optimal Significance Testing," Geoscience and Remote Sensing Symposium, 1993, pp. 1370-1372.

R. O. Duda and P. E. Hart, Pattern Classification and Scene Analysis, New York: John Wiley & Sons, 1973.

P. Mantero, "Partially supervised classification of remote sensing images using SVM-based probability density estimation", IEEE Geo. and Remote Sen., vol. 43, No. 3, Mar. 2005.

B. Eckstein, "Evaluating the Benefits of assisted Target Recognition", Proceeding of the 30th Applied Imagery Pattern recognition Workshop (AIPR01), 2001.

S. Rizvi, "Fusion Techniques for Automatic Target Recognition", Proceedings of the 32nd Applied Imagery Pattern Recognition Workshop (AIPR'03), 2003.

T. C. Minter, "A Discriminant Procedure for Target Recognition in Imagery Data", Proc. of the IEEE 1980 National Aerospace and Electronic Conference—NAECON 1980, May 1980.

R.A. Johnson and D. W. Wichern, Applied Multivariate Statistical Analysis, Prentice-Hall, 5th Edition, 2002, pp. 607.

D. G. Lainiotis, "Sequential Structure and Parameter-Adaptive Pattern Recognition—Part I: supervised Learning," IEEE Trans. Info. Theory, vol. IT-16, No. 5, Nov. 1970, pp. 548.

Q. Jackson, "An Adaptive Classifier Design for High-Dimensional data Analysis With a Limited Training Data Set," IEEE Trans. Geo. and Remote Sensing, vol. 39, No. 12, Dec. 2001.

* cited by examiner

Adaptive Fisher's and Gaussian Maximum Likelihood Classifier Performance on Simulated Data

|  | Gaussian Maximum Likelihood Classifier | Adaptive Fisher's Classifier |
|---|---|---|
| Average Probability of Correct Classification | 88.5% | 88.5% |

Generating Statistics $$\mu_{C_{int}} = \begin{bmatrix} 0 \\ 0 \end{bmatrix}, \quad \Sigma_{C_{int}} = \begin{bmatrix} 1 & -0.5 \\ -0.5 & 1 \end{bmatrix}$$

$$\mu_{C_{other}} = \begin{bmatrix} 1 \\ 1 \end{bmatrix}, \quad \Sigma_{C_{other}} = \begin{bmatrix} 1 & -0.5 \\ -0.5 & 1 \end{bmatrix}$$

$$P_{C_{int}} = 0.5, \quad P_{C_{other}} = 0.5$$

FIG.4C

Classifier Performance on the Salmon Growth Ring Data

| Classifier | Canadian Salmon Classification Accuracy | Alaskan Salmon Classification Accuracy | Average Probability of Classification |
|---|---|---|---|
| Adaptive Fisher's Linear Classifier | 94% | 90% | 92% |
| Gaussian Maximum Likelihood Classifier | 96% | 90% | 93% |

FIG.5B

ADAPTIVE FISHER'S LINEAR DISCRIMINANT

CROSS-REFERENCE TO RELATED APPLICATIONS

This application is related to application Ser. No. 12/004,329 filed on Dec. 20, 2007, entitled "Adaptive Bayes Pattern Recognition", application Ser. No. 12/011,518 filed on Jan. 28, 2008, entitled "Adaptive Bayes Feature Extraction", and application Ser. No. 12/074,901 filed Mar. 6, 2008, entitled "A Priori Probability and Probability of Error Estimation for Adaptive Bayes Pattern recognition".

FEDERALLY SPONSORED RESEARCH

Not Applicable

BACKGROUND

1. Field of Invention

This invention relates generally to a system and method for classifying input patterns into one of two classes, a class-of-interest or a class-other, utilizing an Adaptive Fisher's Linear Discriminant method capable of estimating an optimal linear decision boundary for discriminating between the two classes, when training samples are provided a priori only for the class-of-interest. The system and method eliminates the requirement for any a priori knowledge of the other classes in the data set to be classified.

2. Prior Art

Pattern recognition is used in a variety of engineering and scientific areas. Interest in the area of pattern recognition has been renewed recently due to emerging new applications which are not only challenging but also computationally more demanding [A. K. Jain, R. W. Duin, and J. Mao, "Statistical Pattern Recognition: A Review", *IEEE Transactions on Pattern Analysis and Machine Intelligence*, vol. 22, no. 1, January 2000, pp. 4-37]. These applications include identification of people based on biometrics, classification of remotely sensed images (thematic mapping, crop inventorying), document classification (searching for text documents), financial forecasting, organization and retrieval of multimedia data bases, and recognition of objects-of-interest in images (real-time identification of high valued military targets in imagery, and screening of x-rays and MRI's for medical conditions).

Of particular interest since 9/11 is biometrics—identification of people based on distinctive personal traits (such as facial characteristics, fingerprints, speech patterns) and screening/monitoring people in public places for persons of interest [A. K. Jain, "Biometrics: A Grand Challenge", Proceeding of the 17th International Conference on Pattern Recognition, (ICPR'04)]. In the USA Patriot Act and the Enhanced Border Security and Visa Entry Reform Act of 2002, the U.S. Congress mandated the use of biometrics in U.S. visas [NIST report to the United States Congress, "Summary of NIST Standards for Biometric Accuracy, Tamper Resistance, and Interoperability." Available at ftp://sequoyah.nist.gov/pub/nist_internal_reports/NISTAPP_Nov02.pdf, November 2002.]. This law requires that Embassies and Consulates abroad must now issue to international visitors "only machine-readable, tamper-resistant visas and other travel and entry documents that use biometric identifiers". Congress also mandated the development of technology that uses these biometric identifiers to positively identify person entering the United States.

Most of the literature on pattern recognition is restricted to fully supervised pattern recognition applications where training samples are available which completely characterize all of the classes (or objects) to be recognized in a data set. Using these training samples, optimal discriminant boundaries can be derived which provide minimum error in recognizing these known classes (or objects) in a data set.

However, in many important pattern recognition applications, training samples are only available for the classes-of-interest (or objects-of-interest). The distribution of the other classes may be; 1) unknown, 2) may have changed 3) may be inaccurate due to insufficient numbers of samples used to estimate the distribution of the other classes, or 4) the cost of obtaining labeled training samples may be expensive are difficult to obtain. Often one is only interested in a single class or a small number of classes.

The simplest technique for handling the problem of unknown classes consists of thresholding based on a measure of similarity of a measurement to the class-of-interest [B. Jeon and D. A. Landgrebe, "Partially Supervised Classification With Optimal Significance Testing," Geoscience and Remote Sensing Symposium, 1993, pp. 1370-1372]. If the similarity measure (a statistical probability) is lower than some threshold, the sample is assumed to belong to an unknown class; otherwise, it is assigned to the class-of-interest. Even if an optimal threshold is selected, this procedure does not ensure minimum probability of error in classification.

The Fisher's linear discriminant procedure is used in many pattern recognition applications to discriminate between two classes. It provides accurate classifications and is computationally efficient since it uses a linear decision boundary. However the standard Fisher's linear discrimination procedure requires that training samples be available for the both classes [R. O. Duda and P. E. Hart, *Pattern Classification and Scene Analysis*, New York: John Wiley & Sons, 1973, pp. 115-121].

This invention defines an Adaptive Fisher's Linear Discriminant method for discriminating between two classes, a class-of-interest and a class-other, when training samples are provided a priori only for the class-of-interest. The system and method is capable of estimating an optimal Fisher's linear decision boundary for discriminating between the two without any a priori knowledge of the other classes in the data set to be classified.

The system and method is capable of extracting statistical information corresponding to the "other classes" from the data set to be classified, without recourse to the a priori knowledge normally provided by training samples from the other classes. The system and method provides classification accuracies equivalent to robust and powerful discriminating capability provided by fully supervised classification approaches.

Examples where this type of capability would be very beneficial can be found in Home Land Security, face recognition, remote sensing, and target recognition applications.

Home Land Security has a need for security screening and surveillance in public spaces to determine the presents of a person on a watch-list using facial biometrics [A. K. Jain, "Biometrics: A Grand Challenge", Proceeding of the 17th International Conference on Pattern Recognition, (ICPR'04)]. The screening watch-list typically consists of a few hundred persons. Normally no a priori knowledge is available of the identities on the other persons observed in the public space that might be mis-identified with the people on the watch-list.

In remote sensing applications, ground truth maps providing a priori information on all land cover typologies in an image, do not really describe all the types of land cover types in the image being classified [P. Mantero, "Partially supervised classification of remote sensing images using SVM-based probability density estimation", IEEE Transactions on Geoscience and Remote Sensing, vol. 43, no. 3, March 2005, pp. 559-570]. In addition, one is often interested in identifying picture elements (pixels) belonging to only one or a small number of classes. Generation of a complete training set for all the land cover types in an image is time-consuming, difficult, and expensive.

Target recognition applications [B. Eckstein, "Evaluating the Benefits of assisted Target Recognition", Proceeding of the $30^{th}$ Applied Imagery Pattern recognition Workshop (AIPR"01)] [S. Rizvi, "Fusion Techniques for Automatic Target Recognition", Proceedings of the $32^{nd}$ Applied Imagery Pattern Recognition Workshop (AIPR'03)] often involve recognition of high valued mobile military targets such as tanks in imagery data collected in real time. Often no a priori knowledge is available of the other objects in the image which might be confused with a tank—such as decoys (anything that mimics a target but is not a real target), background clutter, man-made structures, and civilian vehicles.

SUMMARY

This invention relates generally to a system and method for classifying input patterns into one of two classes, a class-of-interest or a class-other, utilizing an Adaptive Fisher's Linear Discriminant method capable of estimating an optimal linear decision boundary for discriminating between the class-of-interest and class-other, when training samples or otherwise, are provided a priori only for the class-of-interest. The system and method eliminates the requirement for any a priori knowledge of the other classes in the data set to be classified, while providing classification accuracies equivalent to the robust and powerful discriminating capability provided by fully supervised classification approaches.

The system and method is capable of extracting statistical information corresponding to the "other classes" from the data set to be classified, without recourse to the a priori knowledge normally provided by training samples from the other classes.

The system and method is adaptive in the sense that the Fisher's linear decision boundary can be re-optimized (adapted) to provide optimal discrimination between the class-of-interest and any unknown other classes in a new data set, using only unlabeled samples from the new data set.

The operation of the system can be divided into an off-line (training) procedure and an on-line (actual classification) procedure.

In the preferred embodiment of the system and method, the off-line procedure utilizes a system module to process a set of labeled patterns, descriptive of the class-of-interest, and unlabeled patterns from the data set to be classified, to provide an optimal Fisher's discriminant projection vector for discriminating between the class-of-interest and the class-other. The labeled patterns from the class-of-interest, unlabeled patterns from the data set to be classified are then projected onto this optimal Fisher's discriminant projection vector to produce a set of one-dimensional labeled and unlabeled scalar measurements. These scalars are then used to obtain a least squares approximation the class-of-interest posterior distribution function, $\hat{P}(C_{int}/X)$.

The on-line procedure then classifies, with minimum error, the unlabeled patterns from an input data set as either class-of-interest or class-other using the estimated value of the posterior probability function, $\hat{P}(C_{int}/X)$, and an adaptive Bayes decision rule.

DRAWINGS—FIGURES

Figure 4A:
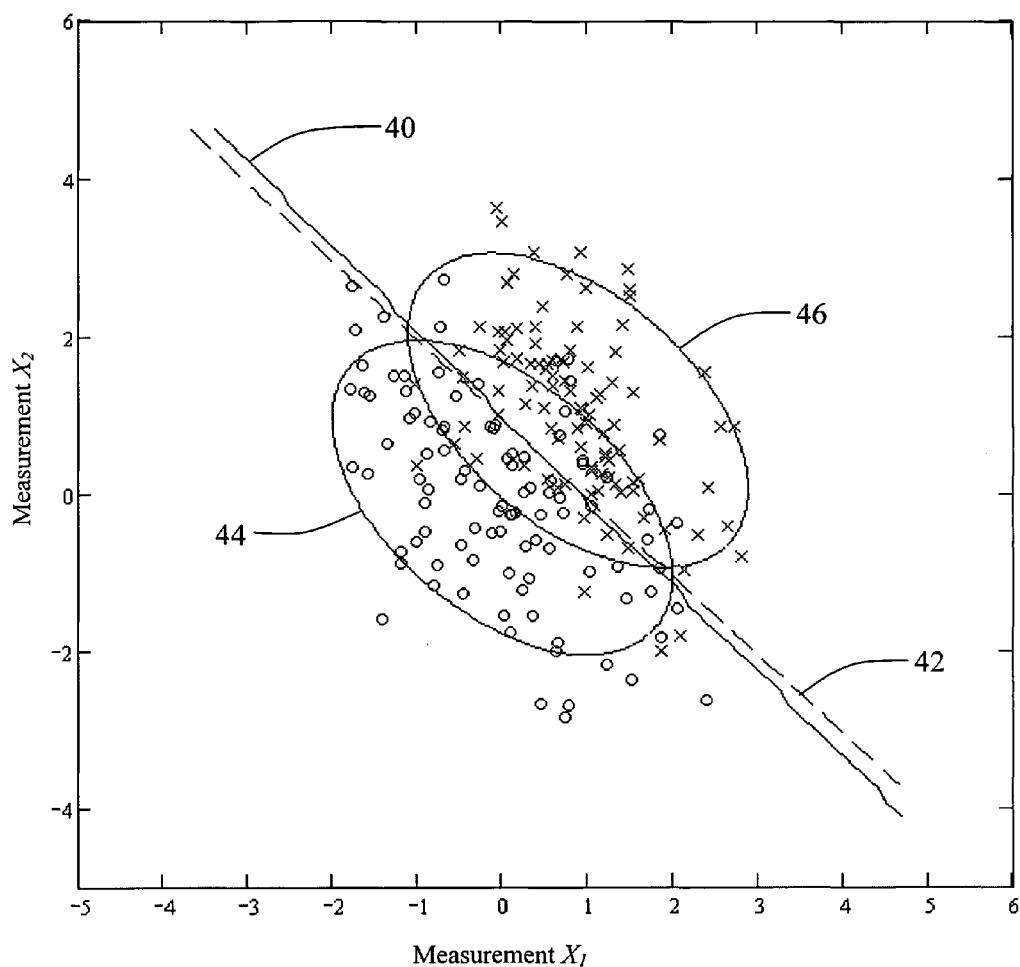

FIGS. 4A to 4C show test results on simulated data for the Adaptive Fisher's Linear Discriminant method and the Gaussian maximum likelihood classified. FIG. 4A shows a plot of the Adaptive Fisher's Linear Discriminant method's decision boundary and a plot of the Gaussian maximum likelihood decision boundary, computed from simulated data. FIG. 4B is a table showing the classification accuracies achieved by the Adaptive Fisher's Linear Discriminant method and the Gaussian maximum likelihood classifier on the simulated data. FIG. 4C shows the generating statistics for the simulated data.

Figure 5A:
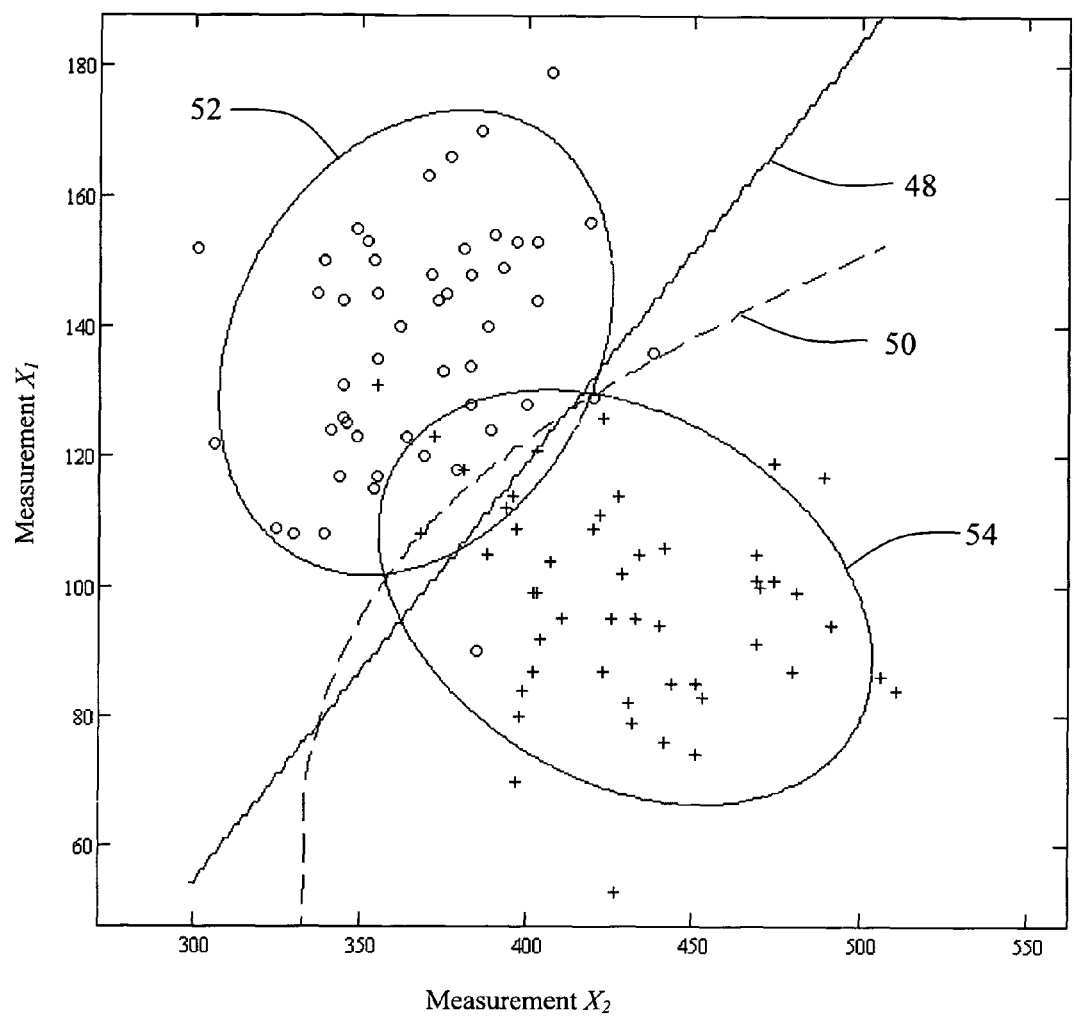

FIGS. 5A and 5B show test results on real data for the Adaptive Fisher's Linear Discriminant method and the Gaussian maximum likelihood classified. FIG. 5A shows a plot of the Adaptive Fisher's Linear Discriminant method's decision boundary and a plot of the Gaussian maximum likelihood decision boundary, computed for the salmon ring growth data. Also shown in FIG. 5A is a scatter plot of the salmon ring growth data and two-standard deviation error ellipses for the two distributions. FIG. 5B shows a table showing the classification accuracies achieved by the Adaptive Fisher's Linear Discriminant method and the Gaussian maximum likelihood classifier on the salmon growth ring data.

DRAWINGS—REFERENCE NUMERALS 10 processing flow diagram for the Adaptive Fisher's Linear Discriminant system and method
12 training module
14 memory
16 user interface device
18 processing unit
20 module for classifying an input data set using the adaptive Fisher's linear classifier
22 output device
24 module for estimating total scatter matrix and class-of-interest scatter matrix
26 module for estimating the between-scatter matrix and the within-scatter matrix
28 module for solving the adaptive Fisher's criterion for eigenvalues and eigenvectors
30 module for selecting eigenvector with largest eigenvalue for use as the adaptive Fisher's discriminant projection vector
32 module for projecting the labeled measurements from the class-of-interest and unlabeled measurements from the input data set onto the adaptive Fisher's discriminant projection vector
34 module for estimating the parameters for a linear approximation of the class-of-interest posterior probability function
36 module for calculating class-of-interest posterior probabilities 38 module for classifying measurements using adaptive Bayes decision rule
40 adaptive Fisher's linear decision boundary
42 Gaussian maximum likelihood decision boundary
44 class-of-interest simulated data and two-standard-deviation error ellipse
46 class-other simulated data and two-standard-deviation error ellipse
48 adaptive Fisher's linear decision boundary
50 Gaussian maximum likelihood decision boundary
52 Canadian Salmon ring growth data and two-standard-deviation error ellipse
54 Alaskan Salmon ring growth data and two-standard-deviation error ellipse

DETAILED DESCRIPTION

Description of the Standard Fisher's Linear Discriminant Method

The Fisher's criterion is a well known criterion for linear discrimination [R. O. Duda and P. E. Hart, *Pattern Classification and Scene Analysis*, New York: John Wiley & Sons, 1973, pp. 115-123]. The Fisher's linear discriminant is normally used in fully supervised pattern recognition applications to classify data into two classes where training samples are available for both classes. The standard Fisher's linear discriminant is defined as follows:

Suppose we are given a set of n d-dimension measurement vectors $X_1, X_2, \ldots X_n$ where $n_1$ samples are in the subset $\Lambda_1$ labeled class 1 and $n_2$ samples are in the subset $\Lambda_2$ labeled class 2. The vector $X_i$ will be called the measurement vector or simply a sample or a pattern and will be denoted as $X_i = (x_1, x_2 \ldots x_d)^T$ where d is the number of measurements or the dimensionality of the measurement space. If we form a linear combination of the components of X, we obtain the one-dimensional scalar Y where $$Y = w^T X \quad (1)$$

and the corresponding set of n samples $Y_1, Y_2, \ldots Y_n$ divide into the subsets $Y_1$ and $Y_2$, corresponding to class 1 and class 2. We wish to select a linear projection direction w where the samples $Y_1$ and $Y_2$ are well separated.

Given labeled samples and the corresponding class statistics (means and covariances) for two classes, the Fisher's linear discriminant criterion can be maximized to find a linear vector, w, which provides the greatest class separation. The Fisher's criterion is $$J(w) = \frac{w^T S_B w}{w^T S_W w} \quad (2)$$

where $S_B$ is the between-classes scatter matrix and $S_W$ is the within-classes scatter matrix.

The means $\mu_1$ and $\mu_2$ of each class are estimated as follows $$\mu_i = \frac{1}{n_i} \sum_{x \in \Lambda_i} X \quad (3)$$

The between-classes scatter matrix $S_B$ is defined as $$S_B = (\mu_1 - \mu_2)(\mu_1 - \mu_2)^T \quad (4)$$

$S_W$ is the within-classes scatter matrix which is defined as $$S_W = P_1 S_1 + P_2 S_2 \quad (5)$$

where $S_1$ and $S_2$ are the covariance matrices of the two classes which are estimated as follows $$S_i = \sum_{x \in \Lambda_i} (X - \mu_i)(X - \mu_i)^T \quad (6)$$

and $P_1$ and $P_2$ are the a priori probabilities of the two classes.

It is easy to show that the vector w that maximizes J, eq. (2), must satisfy $$S_B w = \lambda S_W w \quad (7)$$

which is the generalized eigenvalue problem. If $S_W$ is nonsingular, we can obtain a conventional eigenvalue solution by writing $$S_W^{-1} S_B w = \lambda w \quad (8)$$

Thus, by solving for the eigenvalues $(\lambda_1, \lambda_2 \ldots \lambda_d)$ and eigenvectors, $(V_1, V_2 \ldots V_d)$ of the square matrix $$(S_W)^{-1}(S_B) \quad (9)$$

we obtain a set of eigenvectors which maximize the discrimination between class 1 and class 2.

Let us assume the eigenvalues and eigenvectors are ordered based on the value of the eigenvalues, where $(\lambda_1 > \lambda_2 > \ldots \lambda_d)$. The eigenvector, $V_1$, with the largest eigenvalue, $\lambda_1$, is used as the discriminant projection vector for the Fisher's linear discriminant, or $$w = V_1 \quad (10)$$

To use the Fisher's linear discriminant projection vector in classification, the decision rule is If $w^T X < t$ \quad (11)

Classify X as class of interest,

Otherwise, classify as class-other where w is the Fisher's discriminant projection vector and t is the decision threshold.

Using labeled training samples for the two classes, a threshold value, t, can be selected which minimizes classification error.

To support adaptive pattern recognition applications, a modification of the classical Fisher criterion is required. In adaptive pattern recognition applications, it is assumed that only labeled samples from the class-of-interest and unlabeled samples from the data set to be classified are available for use in defining a decision boundary. In particular, an alternative method is required for estimating the between-class scatter matrix, $S_B$, and the within-class scatter matrix, $S_W$. In addition an alternative method is required for selecting the optimal decision threshold t. These issues are addressed below.

Estimating the Between-Class Scatter Matrix $S_B$ and the Within-Class Scatter Matrix $S_W$ for Adaptive Fisher's Linear Discrimination Estimating the Within-Class Scatter Matrix $S_W$ Let us assume for a moment that we have k classes which consists of a class-of-interest, $C_{int}$, and "k−1" "other" classes, $C_2, C_3 \ldots C_k$ (where the class-of-interest $C_{int} = C_1$). Next let us assume that we are given n, d-dimensional samples $X_1, X_2 \ldots X_n$ from these k classes, with $n_1$ samples in data subset $\Lambda_1$ labeled as class $C_1$, $n_2$ samples in data subset $\Lambda_1$ labeled as class $C_2$, and finally $n_k$ in data subset $\Lambda_k$ labeled as class $C_k$.

Using these labeled samples, the scatter matrix $S_i$ for the $i^{th}$ class is estimated as follows:

$$S_i = \sum_{x \in \Lambda_i} (X - \mu_i)(X - \mu_i)^T \quad (12)$$

where the mean $\mu_i$ for the $i^{th}$ class, in eq.(12), is estimated as follows:

$$\mu_i = \frac{1}{n_i} \sum_{x \in \Lambda_i} X \quad (13)$$

Given scatter matrices for the k classes, from eq. (12), the within-class scatter $S_W$ is defined as $$S_W = \sum_{i=1}^{k} P_{C_i} S_i \quad (14)$$

where $S_i$ is the scatter matrix for the $i^{th}$ class and $P_{C_i}$ is the a priori probability of $i^{th}$ class, $C_i$.

Now let us assume that the scatter matrix for the class-of-interest, $S_{C_{int}}$, is typical of all the scatter matrices encounter in the data set to be classified. This implies that each of these k scatter matrices is equal to scatter matrix of the class-of-interest, or $\{S_1 = S_2 = \ldots S_k = S_{C_{int}}\}$. If we further assume that all of the scatter matrices have equal a priori probabilities, or $$P_{C_i} = \frac{1}{k},$$

then eq. (14) reduces to $$S_W = S_{C_{int}} \quad (15)$$

Estimating the Between-Class Scatter Matrix $S_B$

Normally, the between-class scatter matrix $S_B$ is estimated using the mean vectors of the classes (see eq. (4)). However, in adaptive pattern recognition applications, we assume that we only have information on the class-of-interest and we also assume that we that have no information on the other classes in the data set to be classified. Under these conditions, the between-class scatter matrix, $S_B$, cannot be estimated directly. An alternative procedure for estimating $S_B$ is presented below [R. O. Duda and P. E. Hart, *Pattern Classification and Scene Analysis*, New York: John Wiley & Sons, 1973, pp. 118-119].

Given a set of n unlabeled samples from the data set to be classified, the total scatter matrix $S_T$ for the data set to be classified is defined as $$S_T = \frac{1}{n} \sum_{X \in \Lambda} (X - \mu_T)(X - \mu_T)^T \quad (16)$$

where the total mean, $\mu_T$, of all the data set to be classified and is estimated as follows $$\mu_T = \frac{1}{n} \sum_{x \in \Lambda} X \quad (17)$$

Again, for the moment, let us assume that we do have information on the means of all the classes, per eq. (13). It then follows that $$S_T = \sum_{i=1}^{k} \frac{1}{n_i} \sum_{X \in \Lambda_i} (X - \mu_i + \mu_i - \mu_T)(X - \mu_i + \mu_i - \mu_T)^T \text{ or} \quad (18)$$

$$S_T = \quad (19)$$

$$\sum_{i=1}^{k} \frac{1}{n_i} \sum_{X \in \Lambda_i} (X - \mu_i)(X - \mu_i)^T + \sum_{i=1}^{k} \frac{1}{n_i} \sum_{X \in \Lambda_i} (\mu_i - \mu_T)(\mu_i - \mu_T)^T$$

Using the definition of the within-class scatter matrix, eq. (12) and (14), and setting the prior probabilities to $$P_{C_i} = \frac{1}{n_i},$$

we can rewrite eq. (19) as $$S_T = S_W + \sum_{i=1}^{k} P_{C_i} (\mu_i - \mu_T)(\mu_i - \mu_T)^T \quad (20)$$

Defining the between-class scatter matrix $S_B$ as $$S_B = \sum_{i=1}^{k} P_{C_i} (\mu_j - \mu_T)(\mu_j - \mu_T)^T \quad (21)$$

and substituting (21) into (20), we obtain $$S_T = S_W + S_B \quad (22)$$

and finally, substituting eq. (15) into (22) we get $$S_T = S_{C_{int}} + S_B \quad (23)$$

Rearranging eq. (23), we see that the between-class scatter matrix, $S_B$, can be estimated as follows.

$$S_B = S_T - S_{C_{int}} \quad (24)$$

Substituting eq. (24) and (15) into eq. (2), the Adaptive Fisher's linear discriminant criterion is defined as $$J(w) = \frac{w^T (S_T - S_{C_{int}}) w}{w^T S_{C_{int}} w} \quad (25)$$

The Adaptive Fisher's criterion, eq. (25), supports adaptive pattern recognition, since the within-class scatter matrix $S_W$, eq. (15), and between-class scatter matrix, $S_B$, eq. (24), can be derived using only labeled samples from the class-of-interest and unlabeled samples from the data set to be classified. If a new set of data is considered for classification, the between-class scatter matrix, $S_B$, can be re-estimated using unlabeled samples from the new data set and a new linear discriminant projection vector derived which is optimal for the new data set.

In eq. (25), it is easy to show that a vector w that maximizes J must satisfy $$(S_T - S_{C_{int}})w = \lambda S_{C_{int}} w \qquad (26)$$

which is the generalized eigenvalue problem. If $S_{C_{int}}$ is nonsingular, we can obtain a conventional eigenvalue solution by writing $$S_{C_{int}}^{-1}(S_T - S_{C_{int}})w = \lambda w \qquad (27)$$

Solving for the eigenvalues $(\lambda_1, \lambda_2 \ldots \lambda_d)$ and eigenvectors $(V_1, V_2 \ldots V_d)$ of the square matrix $$(S_{C_{int}})^{-1}(S_T - S_{C_{int}}) \qquad (28)$$

we obtain a set of eigenvectors which maximize the separation between the class-of-interest and the unknown "other" classes in the data set to be classified. Let us assume the eigenvalues and eigenvectors are ordered based on the value of the eigenvalues, where $(\lambda_1 > \lambda_2 > \ldots \lambda_d)$. The eigenvector, $V_1$, with the largest eigenvalue, $\lambda_1$, is used as the adaptive Fisher's discriminant projection vector, or $$w = V_1 \qquad (29)$$

Estimating an Alternative Decision Rule for the Adaptive Fisher's Linear Discriminant Method Next we define an alternative to the standard Fisher's decision rule, eq. (11), which supports the Adaptive Fisher's Linear Discriminant method and addresses the decision threshold issue.

As discussed previously, the Fisher's linear discriminant decision rule, eq. (11), is If $w^T X < t$ (30)

Classify X as class of interest,
Otherwise, classify as class-other
where w is the optimal Fisher's discriminant projection vector which is also the eigenvector with the largest eigenvalue, from eq. (10), and t is the decision threshold.

When labeled training samples are available for the class-of-interest and the other-class, a decision threshold, t, can be selected that maximizes classification accuracy.

However, in adaptive pattern recognition applications where only labeled samples from the "class-of-interest" and unlabeled from the data set to be classified are available, a different decision rule is needed for the Adaptive Fisher's Linear Discriminant method.

Minter [T. C. Minter, "A Discriminant Procedure for Target Recognition in Imagery Data", Proceedings of the IEEE 1980 National Aerospace and Electronic Conference—NAECON 1980, May 20-22, 1980] proposed an adaptive Bayes decision rule which can be used support the Adaptive Fisher's Linear Discrimination method. The Adaptive Bayes decision rule is summarized briefly below.

The Adaptive Bayes Decision Rule

First some background on the standard Bayes decision rule. Bayes decision theory is a fundamental approach to the problem of pattern recognition [R. O. Duda and P. E. Hart, *Pattern Classification and Scene Analysis*, New York: John Wiley & Sons, 1973, pp. 11-21]. The approach is based on the assumption that the decision problem can be poised in probabilistic terms where all of the relevant probability values are known. Specifically, the application of a standard Bayesian classifier usually requires estimating the posterior probabilities of each class. If information is available on class probability densities, the posterior probability can be calculated for each measurement and each measurement is then attributed to the class with the highest posterior probability.

However, this traditional approach is not feasible if unknown "other-classes" are present in the data to be classified. Traditional approaches require that all classes be known in advance and a training set must be available for use in deriving their distributions. A modification to the standard Bayes decision rule is proposed below to address this problem.

The standard decision making process for Bayes pattern recognition can be summarized as follows for classifying data into two classes—a class-of-interest or a class-other:

Given a set of n measurement vectors, $X_1, X_2 \ldots X_n$, it is desired to associate the measurements with either the "class-of-interest" or "class-other" with minimum probability error. The measurement, $X_i$, can conveniently be represented as a d-dimensional vector in the measurement space. This vector will be called the measurement vector or simply as a sample or a pattern and will be denoted as $X_i = (x_1, x_2 \ldots x_d)^T$ where d is the number of measurements or the dimensionality of the measurement space.

For the moment, let us assume that complete information is available on the "class-of-interest" and "class-other". Using training samples from these two classes, we can estimate conditional probability density functions for the two classes—$P(X/C_{int})$ for the "class-of-interest", and $P(X/C_{other})$, for the "class-other". We will assume the associated a priori probabilities for the two classes, $P_{C_{int}}$ and $P_{C_{other}}$, are known. Using these probability estimates, the standard maximum likelihood decision rule for this two class pattern recognition problem is:

If: $P_{C_{int}} P(X/C_{int}) \geq P_{C_{other}} P(X/C_{other})$ (31)

Classify X as the class-of-interest,
Otherwise, classify as class-other
where
$P(X/C_{int})$=conditional probability density function for the "class-of-interest"
$P(X/C_{other})$=conditional probability density function for "class-other"
$P_{C_{int}}$=a priori probability for the "class-of-interest"
$P_{C_{other}}$=a priori probability for the "class-other"

An equivalent decision rule, to that shown in eq. (31), is obtained by dividing both sides of eq. (31) by the unconditional probability of X, which is P(X), or $$\text{If:} \frac{P_{C_{int}}(P(X/C_{int}))}{P(X)} \geq \frac{P_{C_{other}} P(X/C_{other})}{P(X)} \qquad (32)$$

Classify $X$ as the class-of-interest,
Ohterwise, classify as class-other where $$P(X) = P_{C_{int}} P(X/C_{int}) + P_{C_{other}} P(X/C_{other}) \qquad (33)$$

Equation (32) is the Bayes decision rule. It can be defined in terms of posterior probabilities as:

If: $P(C_{int}/X) \geq P(C_{other}/X)$ (34)

Classify X as the class-of-interest,
Otherwise, classify as class-other
where $P(C_{int}/X)$ and $P(C_{other}/X)$ are the posterior probability functions for the "class-of-interest" and the "class-other", respectively. The posterior probability functions are defined as:

$$P(C_{int}/X) = \frac{P_{C_{int}} P(X/C_{int})}{P(X)} \quad (35)$$

$$P(C_{other}/X) = \frac{P_{C_{other}} P(X/C_{other})}{P(X)} \quad (36)$$

Minter [T. C. Minter, "A Discriminant Procedure for Target Recognition in Imagery Data", Proceedings of the IEEE 1980 National Aerospace and Electronic Conference—NAECON 1980, May 20-22, 1980] proposed an alternative Bayes decision rule that can be derived by noting that $$P(C_{int}/X) + P(C_{other}/X) = 1 \quad (37)$$

Rearranging eq. (37) we get $$P(C_{other}/X) = 1 - P(C_{int}/X) \quad (38)$$

Substituting eq. (38) into (34) and simplifying, we obtain an alternative Bayes decision function which only involves the class-of-interest posterior distribution function, or If: $P(C_{int}/X) \geq \frac{1}{2}$ (39)

Classify X as the class-of-interest
Otherwise, classify as class-other
where $$P(C_{int}/X) = \frac{P_{C_{int}} P(X/C_{int})}{P(X)} \quad (40)$$

Equation (39) is referred to as the adaptive Bayes decision rule. The adaptive Bayesian decision rule, eq. (39), is adaptive in the sense that it adapts the decision boundary to provide optimal discrimination between class-of-interest and any unknown class-other which may exist in the data set to be classified.

Implementing the adaptive Bayes rule requires that we obtain estimates for the two density functions $P(X/C_{int})$ and $P(X)$ in eq. (40). The class-conditional probability density function, $P(X/C_{int})$, in the numerator of eq. (40), can be estimated using labeled sample from the class-of-interest. The unconditional probability density function, $P(X)$ in the denominator of eq. (40), is not conditioned of a class and can be estimated using unlabeled samples from the data set to be classified. The a priori probability, $P_{C_{int}}$, is assumed to be known. A number of nonparametric density function estimation techniques are available for estimating $P(X)$. Using these estimates for $P(X/C_{int})$ and $P(X)$, the class-of-interest posterior probability function, $P(C_{int}/X)$, eq. (40), can be estimated and used to classify the input data set using the adaptive Bayes decision rule, eq. (39). If a new data set is to be classified, $P(X)$ can be re-estimated and a new decision boundary, optimal for the new data set, defined.

Least Squares Estimation of the Class-of-Interest Posterior Distribution Function Minter [T. C. Minter, "A Discriminant Procedure for Target Recognition in Imagery Data", Proceedings of the IEEE 1980 National Aerospace and Electronic Conference—NAECON 1980, May 20-22, 1980] proposed a least squares criterion for estimating the adaptive Bayes' posterior distribution, $P(C_{int}/X)$, in eq. (40). The class-of-interest posterior probability function, $P(C_{int}/X)$, can be approximated by minimizing the mean square difference between the estimated posterior probability function and the true posterior probability function for the class-of-interest using the following least squares criterion:

$$J = \int (\hat{P}(C_{int}/X) - P(C_{int}/X))^2 P(X) dX + K \quad (41)$$

In eq. (41), $\hat{P}(C_{int}/X)$ is the estimated class-of-interest posterior probability function, $P(C_{int}/X)$ is the true (but unknown) class-of-interest posterior probability function, and K is an arbitrary constant.

The least squares criteria, shown in eq. (41), cannot be minimized directly since the true class-of-interest posterior probability function, $P(C_{int}/X)$, is unknown.

However, the least square criterion can be reformulated to provide an equivalent criterion that can be minimized to estimate the class-of-interest posterior probability function $\hat{P}(C_{int}/X)$.

First, expanding the least squares criteria, eq. (41), we get $$J = \int (\hat{P}(C_{int}/X)^2 - 2\hat{P}(C_{int}/X) P(C_{int}/X) + P(C_{int}/X)^2) P(X) dX + K \quad (42)$$

and $$J = \int \hat{P}(C_{int}/X)^2 P(X) dX - \int 2\hat{P}(C_{int}/X) P(C_{int}/X) P(X) dX + \int P(C_{int}/X)^2 P(X) dX + K \quad (43)$$

substituting into the second term of eq. (43) the definition of the class-of-interest posterior probability function, $P(C_{int}/X)$, eq. (40), we get $$J = \int \left( \hat{P}(C_{int}/X)^2 P(X) dX - \int 2\hat{P}(C_{int}/X) \frac{P_{C_{int}} P(X/C_{int})}{P(X)} P(X) dX + \int P(C_{int}/X)^2 P(X) dX + K \right) \quad (44)$$

Canceling $P(X)$ in the second term of eq. (44), we get $$J = \int (\hat{P}(C_{int}/X)^2 P(X) dX - \int 2\hat{P}(C_{int}/X) P_{C_{int}} P(X/C_{int}) dX + \int P(C_{int}/X)^2 P(X) dX + K \quad (45)$$

Now let $$K = 2 P_{C_{int}} \quad (46)$$

and noting that $$\int P(X/C_{int}) dX = 1 \quad (47)$$

Combining eq. (46) and eq. (47), we can rewrite eq. (46) as $$K = 2 P_{C_{int}} \int P(X/C_{int}) dX \quad (48)$$

Substituting eq. (48) into eq. (45) and re-arranging, we get:

$$J = \int (\hat{P})(C_{int}/X)^2 P(X) dX + 2 P_{C_{int}} \int [\hat{P}(C_{int}/X) - 1] P(X/C_{int}) dX + \int P(C_{int}/X)^2 P(X) dX \quad (49)$$

Since the third term in eq. (49) is not a function of the estimated class-of-interest posterior probability function, it can be considered a constant, or $$K' = \int P(C_{int}/X)^2 P(X) dX \quad (50)$$

and substituting eq. (50) into eq. (49), we get:

$$J = \int (\hat{P}(C_{int}/X)^2 P(X) dX + 2 P_{C_{int}} \int [\hat{P}(C_{int}/X) - 1] P(X/C_{int}) dX + K' \quad (51)$$

where K' is another constant, which is defined in eq. (50).

Next we define the expected value of a function (∘) with respect to the labeled samples from the class-of-interest, $P(X/C_{int})$, as:

$$E_{C_{int}}(\circ) = \int (\circ) P(X/C_{int}) dX \quad (52)$$

The expected value of a function (∘) with respect to the unlabeled samples from P(X) (the data to be classified) is defined as:

$$E(\circ) = \int (\circ) P(X) dX \qquad (53)$$

Using these definitions, the least square criteria, eq. (51), can be rewritten as:

$$J = E[\hat{P}(C_{int}/X)^2] + 2P_{C_{int}} E_{C_{int}} [\hat{P}(C_{int}/X) - 1] + K' \qquad (54)$$

We will approximate the class-of-interest posterior probability function, $\hat{P}(C_{int}/X)$, using the following linear combination of "scalar functions of the measurements", or $$\hat{P}(C_{int}/X) \cong A^T F(X) \qquad (56)$$

where F(X) is as vector containing k "scalar functions of the measurements"

$$F(X) = (f(X)_1, f(X)_2, \ldots f(X)_k)^T \qquad (57)$$

and A is a vector of weights for the f(X)'s, or $$A = (a_1, a_2, \ldots a_k)^T \qquad (58)$$

Substituting eq. (56) for $\hat{P}(C_{int}/X)$ in eq. (54) we get:

$$J = E[(A^T F(X))^2] + 2P_{C_{int}} E_{C_{int}} [A^T F(X) - 1] + K' \qquad (59)$$

This formulation of the least square error criteria, eq. (59), is equivalent to the original least squares criterion, eq. (41), however, eq. (59) can be evaluated since there are no unknowns. In addition, eq. (59) can be evaluated using only labeled samples from the class-of-interest, $P(X/C_{int})$, and unlabeled samples from the data set to be classified, or P(X).

A useful observation is that the function $A^T F(X)$ is a transformation from the d-dimensional measurement space to the one-dimensional real line. The least-square criterion in eq. (59) is minimized if $A^T F(X)$ maps the class-of-interest samples as close to one as possible and the unlabeled samples, as close to zero as possible.

Differentiating J, in eq. (59), with-respect-to A, setting to zero, and solving we can obtain the following estimator for $A = (a_1, a_2, \ldots a_k)^T$ $$A = P_{C_{int}} E[(F(X)F(X)^T)]^{-1} \cdot E_{C_{int}}[F(X)] \qquad (60)$$

Given a set of n unlabeled samples $(X_1, X_2, \ldots X_n)$ from the data set to be classified and m labeled samples from the class-of-interest $(X_1(C_{int}), X_2(C_{int}), \ldots X_m(C_{int}))$, and the class-of-interest a priori probability $P_{C_{int}}$, the parameter vector $A = (a_1, a_2, \ldots a_k)^T$ may be estimated as follows:

$$A = P_{C_{int}} \left\{ \frac{1}{n} \sum_{i=1}^{n} [(F(X_i) F(X_i)^T)] \right\}^{-1} \cdot \frac{1}{m} \sum_{j=1}^{m} [F(X_j(C_{int}))] \qquad (61)$$

In summary, given an estimate of the parameter vector, $A = (a_1, a_2, \ldots a_k)^T$, from eq. (61), we can estimate the class-of-interest posterior probability function, $\hat{P}(C_{int}/X)$, as follows $$\hat{P}(C_{int}/X) \cong A^T F(X) \qquad (62)$$

$\hat{P}(C_{int}/X)$ can then be used to classify unlabeled measurement vectors from an input data set using the adaptive Bayes decision rule, or If: $\hat{P}(C_{int}/X) \geq \frac{1}{2}$ \qquad (63)

Classify X as class-of-interest,

Otherwise, classify as class-other

It will be shown below that the adaptive Bayes decision method, eq. (62) and eq. (63), can be used to provide as an optimal decision rule for the Adaptive Fisher's Linear Discriminant method.

Using the Adaptive Bayes Decision Rule for Adaptive Fisher's Linear Discrimination A procedure is presented below for estimating an optimal adaptive Bayes decision rule for the Adaptive Fisher's Linear Discriminant method.

Given a set of n unlabeled samples $(X_1, X_2, \ldots X_n)$ from the data set to be classified and m labeled samples from the class-of-interest, $(X_1(C_{int}), X_2(C_{int}), \ldots X_m(C_{int}))$, the between-class scatter matrix $S_B$ and the within-classes scatter matrix $S_W$ are computed per eq. (24) and eq. (15).

The eigenvalues and eigenvectors, $(\lambda_1, \lambda_2, \ldots \lambda_d)$ and $(V_1, V_2, \ldots V_d)$ are computed for the square matrix, $(S_{C_{int}})^{-1} (S_T - S_{C_{int}})$. Let us assume the eigenvalues and eigenvectors are ordered based on the value of the eigenvalues, where $(\lambda_1 > \lambda_2 > \ldots \lambda_d)$. The eigenvector, $V_1$, with the largest eigenvalue, $\lambda_1$, is used as the Fisher's discriminant projection vector w, which provides maximum separation between the class-of-interest and the class-other or $$w = V_1 \qquad (64)$$

Using this projection vector, we can compute the adaptive Fisher's discriminant one-dimensional scalar value Y using $$Y = w^T X \qquad (65)$$

Using eq. (65), a corresponding set of n one-dimensional scalar values $(Y_1, Y_2, \ldots Y_n)$ can be computed from the unlabeled samples $(X_1, X_2, \ldots X_n)$ from the data set to be classified and a corresponding set of m one-dimensional scalar values $(Y_1(C_{int}), Y_2(C_{int}), \ldots Y_m(C_{int}))$ from the labeled samples from the class-of-interest, $(X_1(C_{int}), X_2(C_{int}), \ldots X_m(C_{int}))$.

The class-of-interest posterior probability function, $\hat{P}(C_{int}/Y)$, will be approximated using a linear function, or $$\hat{P}(C_{int}/Y) \cong A^T F(Y) \qquad (66)$$

where we define $$A = (a_0, a_1)^T \qquad (67)$$

$$F(Y) = (1, Y)^T \qquad (68)$$

or $$A^T F(Y) = a_0 + a_1 Y \qquad (69)$$

The weighting parameters, $A = (a_0, a_1)^T$, are estimated using the sets of one-dimensional scalar measurements $(Y_1, Y_2, \ldots Y_n)$ and $(Y_1(C_{int}), Y_2(C_{int}), \ldots Y_m(C_{int}))$, and the and the class-of-interest a priori probability $P_{C_{int}}$, as follows $$A = P_{C_{int}} \left\{ \frac{1}{n} \sum_{i=1}^{n} [(F(Y_i) F(Y_i)^T)] \right\}^{-1} \cdot \frac{1}{m} \sum_{j=1}^{m} [F(Y_j(C_{int}))] \qquad (70)$$

Substituting eq. (69) into eq. (66), the class-of-interest posterior probability function, $\hat{P}(C_{int}/Y)$, is estimated using a linear function, as follows $$\hat{P}(C_{int}/Y) \cong a_0 + a_1 Y \qquad (71)$$

Substituting eq. (65) into eq. (71), the class-of-interest posterior probability function, $\hat{P}(C_{int}/X)$, can be calculated in terms of the measurement vector X and the adaptive Fisher's discriminant projection vector, w, as $$\hat{P}(C/X) \approx a_0 + a_1 w^T X \quad (72)$$

Using eq. (72) to estimate $\hat{P}(C_{int}/X)$, the adaptive Bayes decision rule can now used to classify the measurement vectors, $(X_1, X_2, \ldots X_n)$, or $$\text{If: } \hat{P}(C_{int}/X) \geq \tfrac{1}{2} \quad (73)$$

Classify X as the class-of-interest

Otherwise, classify as class-other

Thus, the adaptive Bayes decision rule, eq. (73), has been formulated in terms of the measurement vector X and the adaptive Fisher's discriminant projection vector w.

The adaptive Bayes decision rule, eq. (73), is adaptive in the sense that it can readily be re-optimize (adapt) the decision boundary to provide optimal discrimination between class-of-interest and any unknown class-other which may exist in the data set to be classified. If a new data is to be classified, a new adaptive Fisher's discriminant projection vector, w, can be estimated and a new weighting parameters, $A = (a_0, a_1)^T$, can be estimated, which provides an optimal adaptive Fisher's linear discriminant boundary for classifying the new data set.

OPERATION—FIGS. 1, 2, 3, 4, and 5

Figure 1:
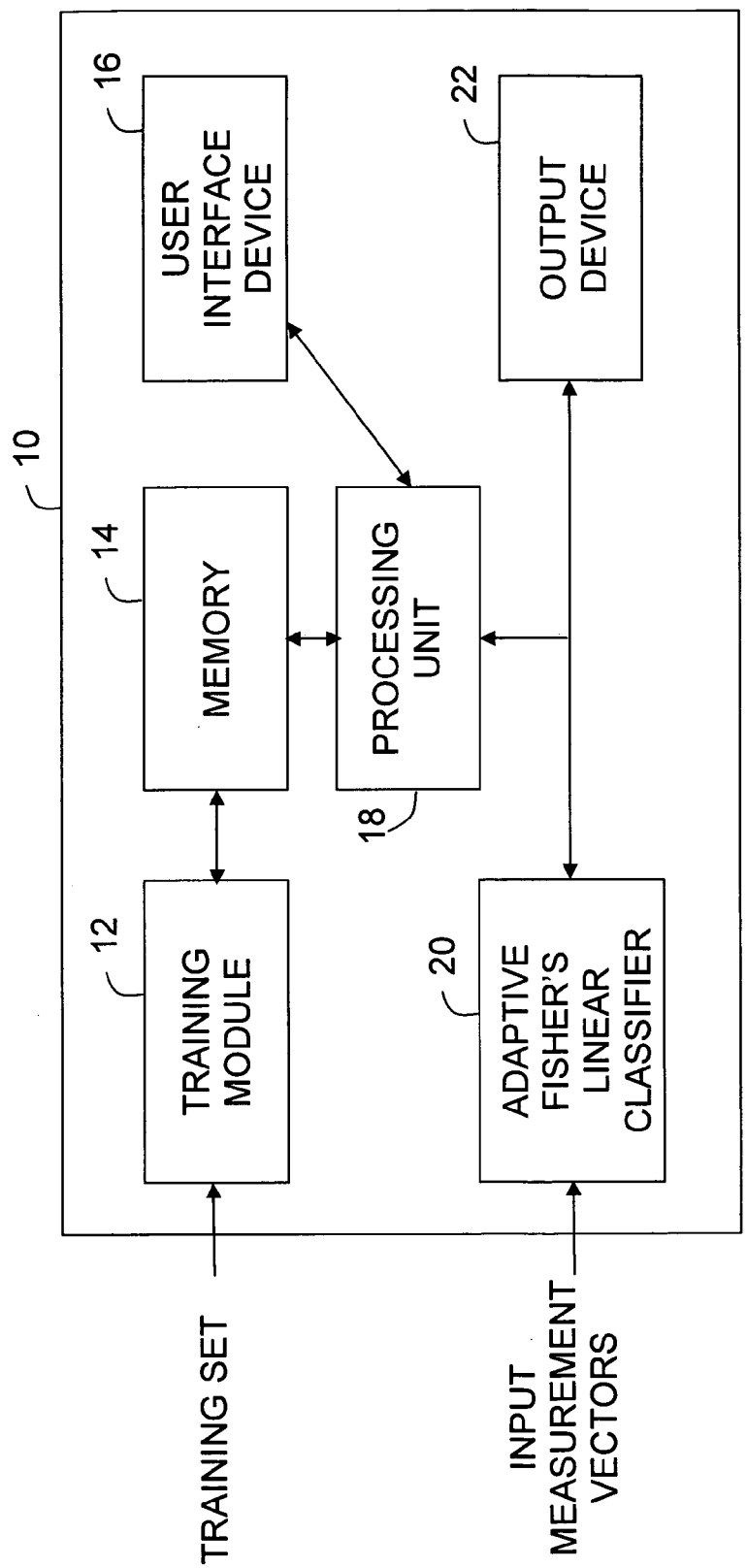
FIG. 1 is a block diagram for the preferred embodiment of the Adaptive Fisher's Linear Discriminant system and method, including its components.

With reference to FIG. 1, an Adaptive Fisher's Linear Discriminant system and method 10 is defined consisting of a training module 12, memory 14, a user interface device 16, a processing unit 18, an adaptive Fisher's linear classifier 20, and an output device 22. The Adaptive Fisher's Linear Discrimination system and method operates to classify input measurement vectors into two classes, the class-of-interest or class-other. The Adaptive Fisher's Linear Discrimination system and method can be used in a number of applications, such as target recognition, classifying remote sensing image, and face detection.

Figure 2:
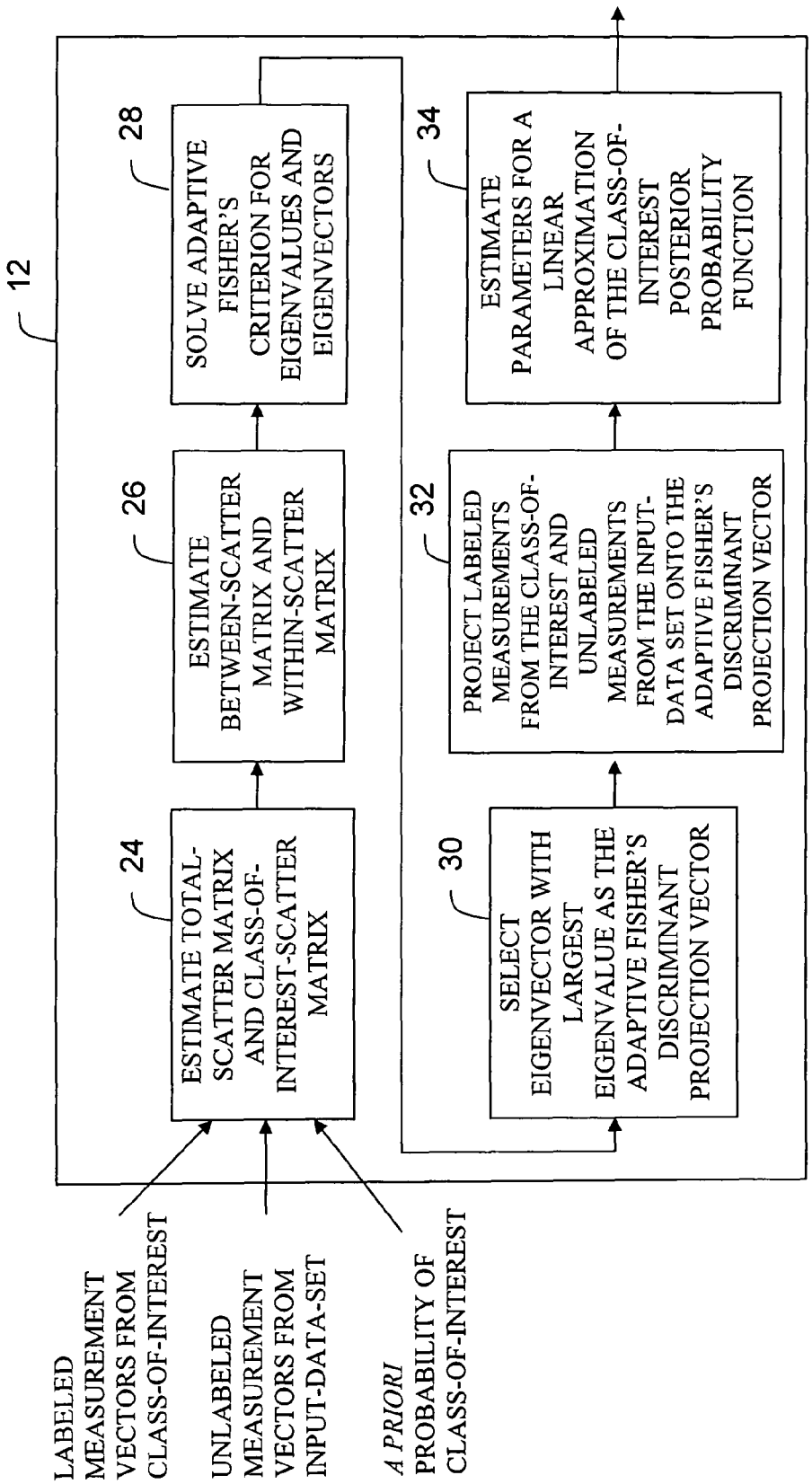
FIG. 2 is the processing flow diagram for the off-line training module for the preferred embodiment of the Adaptive Fisher's Linear Discriminant method.

Description of the Off-Line Processing for the Adaptive Fisher's Linear Discriminant Method Step 1—Computing the Total Scatter Matrix and the Class-of-Interest Scatter Matrix Referencing FIG. 2, the off-line method 12 begins with step 24, where the total scatter matrix is computed for the unlabeled measurement vectors from the data set to be classified using eq.(16), or $$S_T = \frac{1}{n} \sum_{X \in \Lambda} (X - \mu_T)(X - \mu_T)^T \quad (74)$$

where the total mean, $\mu_T$, of all the data to be classified is estimated as follows $$\mu_T = \frac{1}{n} \sum_{X \in \Lambda} X \quad (75)$$

where the data subset $\Lambda$ is a set of n unlabeled samples from the input data set.

Again referencing FIG. 2 step 24, the class-of-interest scatter matrix, $S_{C_{int}}$, is computed using $$S_{C_{int}} = \frac{1}{m} \sum_{X \in \Lambda_{C_{int}}} (X - \mu_{C_{int}})(X - \mu_{C_{int}})^T \text{ and} \quad (76)$$

$$\mu_{C_{int}} = \frac{1}{m} \sum_{X \in \Lambda_{C_{int}}} X \quad (77)$$

where the data subset $\Lambda_{C_{int}}$ is a set of m labeled samples from the class-of-interest.

Step 2—Computing the Within-Class Scatter Matrix and the Between-Class Scatter Matrix Referencing FIG. 2, step 26, the within-class scatter matrix $S_W$ is estimated using eq. (15), or $$S_W = S_{C_{int}} \quad (78)$$

Referencing FIG. 2, in step 26, the between-class scatter matrix, $S_B$, is estimated using eq.(24), or $$S_B = S_T - S_{C_{int}} \quad (79)$$

Step 3—Solving the Adaptive Fisher's Criterion for Eigenvalues and Eigenvectors

Referencing FIG. 2, step 28, the adaptive Fisher's criterion $$J(w) = \frac{w^T(S_T - S_{C_{int}})w}{w^T S_{C_{int}} w} \quad (80)$$

is solved for the discriminant projection vector w which maximizes the distance between the class-of-interest and class-other. This is accomplished by solving for the eigenvalues $(\lambda_1, \lambda_2 \ldots \lambda_d)$ and eigenvectors, $(V_1, V_2 \ldots V_d)$ of the square matrix $$(S_{C_{int}})^{-1}(S_T - S_{C_{int}}) \quad (81)$$

Step 4—Selecting the Eigenvector with Largest Eigenvalue as the Adaptive Fisher's Discriminant Projection Vector Referencing FIG. 2, step 30, the eigenvalues and eigenvectors are ordered based on the value of the eigenvalues, $(\lambda_1 > \lambda_2 > \ldots \lambda_d)$. The eigenvector, $V_1$, with the largest eigenvalue, $\lambda_1$, is selected for use as the discriminant projection vector for the adaptive Fisher's linear discriminant, or $$w = V_1 \quad (82)$$

Step 5—Projecting the Labeled Measurements from the Class-of-Interest and Unlabeled Measurements from the Input Data Set Onto the Adaptive Fisher'S Discriminant Projection Vector Referencing FIG. 2, in step 32, the n unlabeled measurements from the data set to be classified $(X_1, X_2 \ldots X_n)$ and the m labeled measurements from the class-of-interest, $(X_1(C_{int}), X_2(C_{int}) \ldots X_n(C_{int}))$, are projected onto the Fisher's discriminant projection vector w to obtain the sets of one-dimensional scalar measurements $(Y_1, Y_2 \ldots Y_n)$ and $(Y_1(C_{int}), Y_2(C_{int}) \ldots Y_m(C_{int}))$ respectively, using $$Y = w^T X \quad (83)$$

Step 6—Estimating Parameters for a Linear Approximation of the Class-of-Interest Posterior Probability Function Again referencing FIG. 2, in step 34, the sets of one-dimensional scalars $(Y_1, Y_2 \ldots Y_n)$ and $(Y_1(C_{int}), Y_2$ $(C_{int}) \ldots Y_m(C_{int}))$ are used to approximate the class-of-interest posterior probability function, $\hat{P}(C_{int}/Y)$, using the linear function $A^T F(Y)$, or $$\hat{P}(C_{int}/Y) \cong A^T F(Y) \tag{84}$$

where $$A = (a_0, a_1)^T \tag{85}$$

$$F(z) = (1, Y)^T \tag{86}$$

or $$A^T F(Y) = a_0 + a_1 Y \tag{87}$$

The weighting parameters, $A = (a_0, a_1)^T$, are estimated using the sets of one-dimensional scalar measurements, $(Y_1, Y_2 \ldots Y_n)$ and $(Y_1(C_{int}), Y_2(C_{int}) \ldots Y_m(C_{int}))$, and the class-of-interest a priori probability $P_{C_{int}}$, or $$A = P_{C_{int}} \left\{ \frac{1}{n} \sum_{i=1}^{n} [(F(Y_i) F(Y_i)^T)] \right\}^{-1} \cdot \frac{1}{m} \sum_{j=1}^{m} [F(Y_j(C_{int}))] \tag{88}$$

Substituting eq. (87) into eq. (84), the class-of-interest posterior probability function, $\hat{P}(C_{int}/Y)$, is estimated as $$\hat{P}(C_{int}/Y) \cong a_0 + a_1 Y \tag{89}$$

Now, substituting eq. (83) into eq. (89), we can now estimate the class-of-interest posterior probability function, $\hat{P}(C_{int}/X)$, in terms of the measurement vector X and the adaptive Fisher's discriminant projection vector w, or $$\hat{P}(C_{int}/X) \cong a_0 + a_1 w^T X \tag{90}$$

Figure 3:
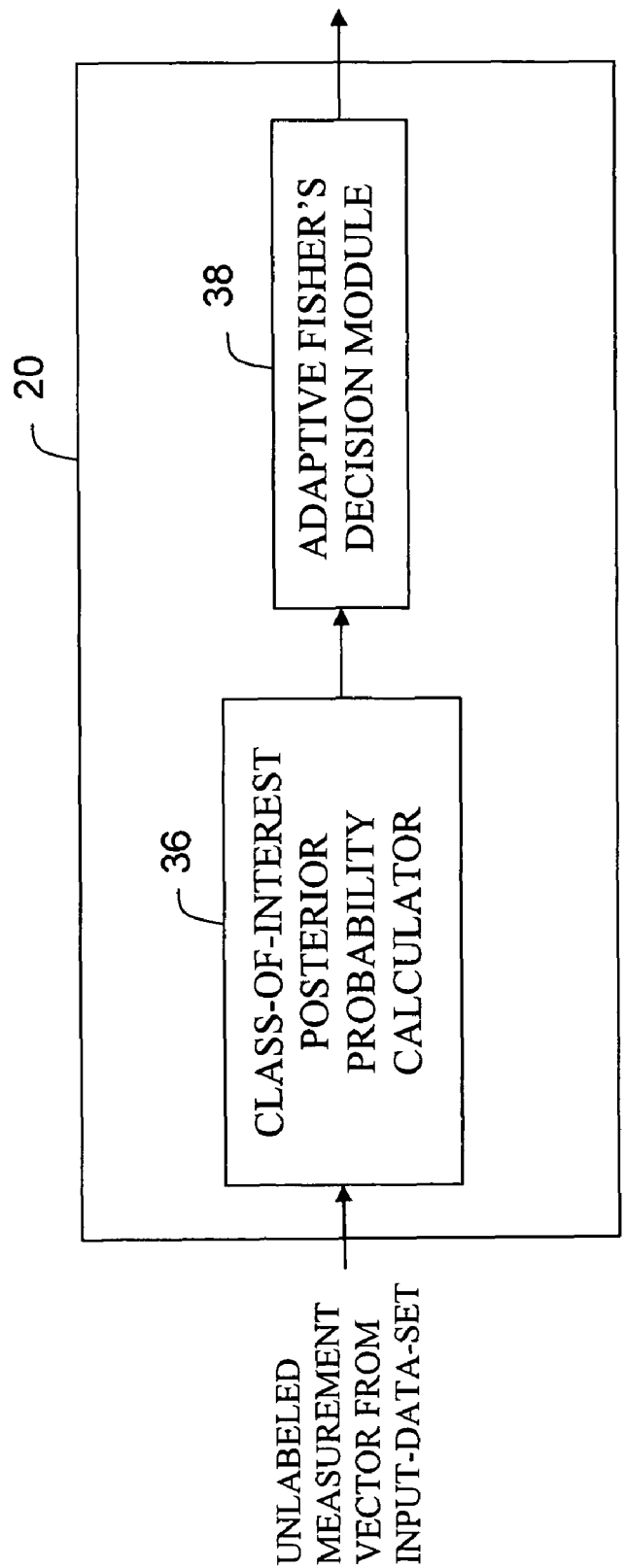
FIG. 3 is the on-line processing flow for the Adaptive Fisher's Linear Discriminant method.

Description of the On-Line Processing for the Adaptive Fisher's Linear Discriminant Method Step 1—Calculating the Class-of-Interest Posterior Probability Referencing FIG. 3, the on-line processing 20 for the Adaptive Fisher's Linear Discriminant method starts with step 36, where the value of class-of-interest posterior probability, $\hat{P}(C_{int}/X)$, is calculated for each unlabeled sample X in the input data set using $$\hat{P}(C_{int}/X) \cong a_0 + a_1 w^T X \tag{91}$$

Step 2—Applying the Adaptive Bayes Decision Rule

Again referencing FIG. 3, in step 38, each of the unlabeled measurement vectors $(X_1, X_2 \ldots X_n)$ from the input data set is classified as either class-of-interest or class-other using the adaptive Bayes decision rule, or $$\text{If: } \hat{P}(C_{int}/X) \geq \tfrac{1}{2} \tag{92}$$

Classify X as the class-of-interest
Otherwise, classify as class-other
Performance Tests of the Adaptive Fisher's Linear Discriminant Method on Simulated and Real Data Two test cases are presented which demonstrate the performance of the Adaptive Fisher's Discriminant method on simulated and real data.

The first test case is on simulated data generated from multivariate normals with equal covariance matrices. When two multivariate normals have equal covariance matrices, it can be shown that the optimal decision boundary is linear [R. O. Duda and P. E. Hart, *Pattern Classification and Scene Analysis*, New York: John Wiley & Sons, 1973, pp. 27-28]. The performance of the Adaptive Fisher's Linear Discriminant method is compared with the performance of the Gaussian maximum likelihood classifier. This test case demonstrates the performance of the Adaptive Fisher's Linear Discriminant method under the condition where the optimal decision boundary is known to be linear.

The second test case is on a real data collected by the United States and Canada governments on salmon fish. The two multivariate normals have unequal covariance matrices. The optimal decision boundary for this data set is a quadratic [R. O. Duda and P. E. Hart, *Pattern Classification and Scene Analysis*, New York: John Wiley & Sons, 1973, pp. 30]. Again, the performance of the Adaptive Fisher's Linear Discriminant method is compared with the performance of the Gaussian maximum likelihood classifier. This test case demonstrates the performance of the Adaptive Fisher's Linear Discriminant method under the condition where the optimal decision boundary is not linear.

Performance Test Results on Simulated Data

Simulated data was generated from two Gaussian distributions with the statistics shown in FIG. 4C. One hundred labeled samples were generated from each of these two normals. A set of two-hundred unlabeled data samples was constructed by combining the samples generated from these two distributions—minus the class labels. Referencing FIG. 4C, it can be seen that the two normals with equal covariances. Therefore, the optimal decision boundary for discriminating between the two classes is a linear decision boundary.

FIG. 4A shows a scatter plot of the data generated from these two normal distributions. Also shown in FIG. 4A are two-sigma error ellipses for the class-of-interest 44 and for class-other 46.

Also shown in FIG. 4A is the decision boundary 40 estimated by the Adaptive Fisher's Linear Discriminant method. The Adaptive Fisher's Linear Discriminant method was trained using 100 labeled samples from the class-of-interest 44 and the 200 unlabeled samples from the two distributions For comparison, FIG. 4A also shows the decision boundary 42 estimated by the Gaussian Maximum Likelihood classifier. The Gaussian Maximum Likelihood classifier decision boundary is the optimal decision boundary for this data set and it can be seen to be linear. The Gaussian Maximum Likelihood classifier was trained using labeled data from the two classes to estimate means vectors and covariance matrices.

It can be seen in FIG. 4A that the Adaptive Fisher's Linear Discriminant method decision boundary 40 is nearly identical to the Gaussian Maximum Likelihood classifier decision boundary 42. However, it is important to noted that the Adaptive Fisher's Linear Discriminant method's decision boundary was estimated using only labeled training samples from the class-of-interest and unlabeled samples from the two classes.

The table in FIG. 4B shows the classification performance for the Adaptive Fisher's Linear Discriminant method and the Gaussian Maximum Likelihood classifier on the simulated data. It can be seen in FIG. 4B that the Adaptive Fisher's classifier provides classification accuracies identical to that provided by the Gaussian Maximum Likelihood classifier.

Test Results from Classifying Alaskan and Canadian Salmon Growth Ring Data

The salmon fishery is a valuable resource for both the United States and Canada [R. A. Johnson and D. W. Wichern, *Applied Multivariate Statistical Analysis*, Prentice-Hall, 5$^{th}$ Edition, 2002, pp. 607]. Because it is a limited resource, it must be managed efficiently. Moreover, since more than one country is involved, problems must be resolved equitably. That is, Alaskan commercial fishermen cannot catch too many Canadian salmon and vise versa.

To help regulate catches, samples of fish taken during the harvest must be identified as coming from Alaskan or Canadian waters. Salmon are born in freshwater and mature in the ocean before returning to fresh water streams to spawn and die. The fish carry information about their birthplace in the growth rings on their scales. Typically, the rings associated with first-year freshwater growth are smaller for the Alaskan-born than for the Canadian-born salmon. In addition, the rings associated with first-year saltwater growth are smaller for the Canadian-born salmon than for the Alaskan-born salmon. Fifty labeled samples were available for each class.

The Adaptive Fisher's Linear Discriminant method was trained using 50 labeled samples from the class-of-interest (the Canadian salmon) and 100 unlabeled samples obtained by removing the labels from the two sets of salmon ring data.

The Gaussian Maximum Likelihood classifier was trained using labeled data from the two classes to estimate means vectors and covariance matrices.

FIG. 5A shows a plot of the data for the Canadian salmon and Alaskan salmon (magnified 100 times). Also plotted in FIG. 5A are two-sigma error ellipses for the two probability density functions—the Canadian salmon is reference numeral 52 and the Canadian salmon is reference numeral 54. FIG. 5A also shows the decision boundaries estimated by the Adaptive Fisher's Linear Discriminant method 48 and the Gaussian Maximum Likelihood classifier, 50. Again, the Adaptive Fisher's Linear Discriminant method's linear decision boundary was estimated using only labeled samples for the class-of-interest (the Canadian salmon data) and unlabeled sample from both classes. The a priori probabilities of both classes were assumed to be known and equal to 0.5 each.

Since the covariances of the two classes are not equal, the optimal decision boundary is a quadratic function—as evidenced by the Gaussian decision boundary 50 in FIG. 5A. However, it can be seen that the Adaptive Fisher's Linear Discriminant method's linear decision boundary, 48, provides a reasonable approximation of the quadratic decision boundary.

The table in FIG. 5B, tabulates the classification accuracies achieved on the salmon growth ring data set for the Adaptive Fisher's Linear Discriminant method and the Gaussian Maximum Likelihood classifier. The Gaussian Maximum Likelihood classifier provided slightly higher classification accuracy than the Adaptive Fisher's Linear Discriminant method. This is to be expected since the optimal decision boundary for this data set is a quadratic function.

Conclusions from Performance Tests

The test results on the simulated data and the salmon ring data demonstrated that the Adaptive Fisher's Linear Discriminant method is capable of extracting statistical information corresponding to the "other-classes" without recourse to the a priori knowledge normally provided by training samples from the "other-classes". The tests demonstrated that the Adaptive Fisher's Linear Discriminant method is capable of providing classification accuracies equivalent to the robust and powerful discriminating capability provided by fully supervised classification approaches.

CONCLUSIONS, RAMIFICATIONS, AND SCOPE

Accordingly the reader will see that the Adaptive Fisher's Linear Discriminant method and system can be used in many real world applications where class definitions, through training samples or otherwise, are provided a priori only for the classes-of-interest. The distribution of the other-class may be 1) unknown, 2) may have changed 3) may be inaccurate due to insufficient numbers of samples used to estimate the distribution of the other-class, or 4) the cost of obtaining labeling samples, for purposes of defining all the classes in a given data set by collecting ground truth or otherwise, may be very expensive or impossible to obtain. Often one is only interested in one class or a small number of classes.

Examples where the capabilities of the Adaptive Fisher's Linear Discriminant method and system would be potentially very beneficial can be found in Home Land Security, face recognition, remote sensing, and target recognition.

Of particular interest since 9/11 are biometrics [A. K. Jain, "Biometrics: A Grand Challenge", Proceeding of the 17$^{th}$ International Conference on Pattern Recognition, (ICPR'04)] which involves identification of people based on distinctive personal traits (such as facial characteristics, fingerprints, iris patterns, speech patterns) and screening/monitoring of people in public places for persons of interest. In the USA Patriot Act and the Enhanced Border Security and Visa Entry Reform Act of 2002, the U.S. Congress mandated the use of biometrics in U.S. visas [NIST report to the United States Congress, "Summary of NIST Standards for Biometric Accuracy, Tamper Resistance, and Interoperability." Available at ftp://sequoyah.nist.gov/pub/nist_internal_reports/ NISTAPP_Nov02.pdf, November 2002]. This law requires that Embassies and Consulates abroad must now issue to international visitors, "only machine-readable, tamper-resistant visas and other travel and entry documents that use biometric identifiers". Congress also mandated the development of technology that uses these biometric identifiers to positively identify person entering the United States.

In addition, Home Land Security has a need for security screening and surveillance in public spaces to determine the presents of people on a watch-list using facial biometrics [A. K. Jain, "Biometrics: A Grand Challenge", Proceeding of the 17$^{th}$ International Conference on Pattern Recognition, (ICPR'04)]. The screening watch-list typically consists of pictures of a few hundred persons. Normally, no a priori knowledge is available of the identities on the other persons observed in the public space that might be mis-identified with people on the watch-list.

In remote sensing applications, ground truth maps, providing prior information on all land cover typologies in an image, do not really describe all the types of land cover types in the image [P. Mantero, "Partially supervised classification of remote sensing images using SVM-based probability density estimation", IEEE Transactions on Geoscience and Remote Sensing, vol. 43, no. 3, March 2005, pp. 559-570]. In addition, one is often interested in identifying picture elements (pixels) belonging to only one or a small number of classes. Generation of a complete training set for all the land cover types in an image is time-consuming, difficult, and expensive.

Target recognition applications [B. Eckstein, "Evaluating the Benefits of assisted Target Recognition", Proceeding of the 30$^{th}$ Applied Imagery Pattern recognition Workshop (AIPR"01)] [S. Rizvi, "Fusion Techniques for Automatic Target Recognition", Proceedings of the 32$^{nd}$ Applied Imagery Pattern Recognition Workshop (AIPR'03)] often involve recognition of high valued mobile military targets such as tanks in imagery data collected in real time. Often no prior knowledge is available of the other objects in the image which might be confused with a tank, such as decoys (anything that mimics a target but is not a real target), background clutter, man-made structures, and civilian vehicles.

Additional advantages of the Adaptive Bayes Pattern Recognition system are:
The method is nonparametric. An optimal Fisher's linear decision boundary can be estimated without prior knowledge of class probability density functions.
The method is adaptive in the sense that it adapts the decision boundary to provide optimal Fisher's discrimination between class-of-interest and any unknown class-other which may exist in the data set to be classified.

The method is computationally efficient and suitable for real-time application.

While my above description contains many specificities, these should not be construed as limitations on the scope of the invention, but rather as an exemplification of the presently preferred embodiments. The scope of the embodiment should be determined by appended claims and their legal equivalents, rather than by the examples given.

I claim:

1. A computer-implemented method for classifying a pattern into one of two classes, a class-of-interest or a class-other, comprising:

receiving a set of labeled patterns from a class-of-interest, a set of unlabeled patterns from an input data set, and an estimate of the a priori probability of said class-of-interest in said input data set, said input-data-set being at least one of an image, video or speech data set;

estimating a within-class scatter matrix;

estimating a between-class scatter matrix;

computing the eigenvalues and eigenvectors for an adaptive Fisher's criterion;

selecting an eigenvector with the largest eigenvalue as the adaptive Fisher's discriminant projection vector;

projecting each labeled pattern in said set of labeled patterns from said class-of-interest and each unlabeled pattern in said set of unlabeled patterns from said input data set onto said adaptive Fisher's discriminant projection vector to provide a set of labeled scalar measurements for said class-of-interest patterns and a set of unlabeled scalar measurements for the input data set patterns;

executing a training stage using said a priori probability of said class-of-interest in said input data set, said set of labeled scalar measurements for said class-of-interest patterns, and said set of unlabeled scalar measurements for said input data set patterns, to estimate parameters for a function providing a least squares approximation of a class-of-interest posterior probability function;

classifying said pattern into one of two classes, a class-of-interest or a class-other, in accordance with a conditional test defined by an adaptive Bayes decision rule; and wherein said pattern is classified using an optimal Fisher's linear decision boundary as either said class-of-interest or as said class-other by projecting said pattern onto said adaptive Fisher's discriminant projection vector and classifying said pattern as either said class-of-interest or as said class-other using said adaptive Bayes decision rule, without prior knowledge of said class-other.

2. The method of claim 1 wherein said step of estimating said within-class scatter matrix includes a step of estimating a class-of-interest scatter matrix using said labeled patterns from said class-of-interest and setting said within-class scatter matrix equal to said class-of-interest scatter matrix.

3. The method of claim 1 wherein said step of estimating said between-class scatter matrix includes a step of estimating a total scatter matrix using said unlabeled patterns from said input data set and setting said between-class scatter matrix equal to the difference between said total scatter matrix and said class-of-interest scatter matrix.

4. The method of claim 1 wherein said step of computing the eigenvalues and eigenvectors for the adaptive Fisher's criterion includes a step of solving the adaptive Fisher's criterion for a set of said eigenvalues and said eigenvectors which maximize the separation between said class-of-interest and said other-classes in the said input data set.

5. The method of claim 1 wherein said step of selecting said eigenvector with said largest eigenvalue as said adaptive Fisher's discriminant projection vector includes a step of ordering said eigenvalues from high to low, selecting said eigenvector with said largest eigenvalue and setting said adaptive Fisher's discriminant projection vector equal to said eigenvector with said largest eigenvalue.

6. The method of claim 1 wherein said step of estimating said parameters for said function which provides said least squares approximation of said class-of-interest posterior probability function includes a step of estimating said set of parameters for a linear function which provides said least squares approximation of said class-of-interest posterior probability function.

7. The method of claim 1 wherein said step of classifying said pattern into one of two classes, said class-of-interest or said class-other, in accordance with said conditional test defined by said adaptive Bayes decision rule includes a step of estimating the class-of-interest posterior probability that said pattern is from said class-of-interest using said function which provides said least squares approximation of said class-of-interest posterior probability function.

* * * * *